`US009369956B2`

(12) United States Patent
Lee et al.

(10) Patent No.: US 9,369,956 B2
(45) Date of Patent: Jun. 14, 2016

(54) BASE STATION IN CELLULAR NETWORK SYSTEM AND SLEEP CONTROL METHOD FOR BASE STATION

(71) Applicant: HITACHI, LTD., Tokyo (JP)

(72) Inventors: Dongheon Lee, Beijing (CN); Sheng Zhou, Beijing (CN); Peng Yang, Beijing (CN); Chunguang Liu, Beijing (CN); Zhisheng Niu, Beijing (CN); Mika Mizutani, Beijing (CN)

(73) Assignee: Hitachi, Ltd., Tokyo (JP)

( * ) Notice: Subject to any disclaimer, the term of this patent is extended or adjusted under 35 U.S.C. 154(b) by 102 days.

(21) Appl. No.: 14/166,084

(22) Filed: Jan. 28, 2014

(65) Prior Publication Data

US 2014/0219150 A1 Aug. 7, 2014

(30) Foreign Application Priority Data

Feb. 1, 2013 (CN) .......................... 2013 1 0041016

(51) Int. Cl.
*H04W 4/00* (2009.01)
*H04W 52/02* (2009.01)

(52) U.S. Cl.
CPC ............ *H04W 52/0206* (2013.01); *Y02B 60/50* (2013.01)

(58) Field of Classification Search
None
See application file for complete search history.

(56) References Cited

U.S. PATENT DOCUMENTS

| 7,378,960 | B1 * | 5/2008 | Binding ................. | G06Q 10/08 235/384 |
|---|---|---|---|---|
| 2008/0031174 | A1 * | 2/2008 | Saifullah ................ | H04B 7/155 370/311 |
| 2010/0234006 | A1 * | 9/2010 | Vadlamudi ..................... | 455/418 |
| 2011/0037601 | A1 * | 2/2011 | Kumar et al. ................. | 340/635 |
| 2012/0106423 | A1 | 5/2012 | Nylander et al. | |
| 2013/0143550 | A1 * | 6/2013 | Ostrup et al. ................. | 455/424 |
| 2013/0189932 | A1 | 7/2013 | Shen et al. | |
| 2015/0245270 | A1 * | 8/2015 | Wu ....................... | H04W 36/22 370/331 |

FOREIGN PATENT DOCUMENTS

CN          102421172 A      4/2012

OTHER PUBLICATIONS

S. Zhou et al., "Green Mobile Access Network with Dynamic Base Station Energy Saving", Sep. 2009, Beijing, China.

* cited by examiner

*Primary Examiner* — Anh-Vu Ly
(74) *Attorney, Agent, or Firm* — Mattingly & Malur, PC

(57) ABSTRACT

The base station includes: a determination unit for comparing states of traffic currently provided by the base station and other neighboring base stations and determining whether the base station has the lowest traffic; an information transmission unit for sending a sleep request and a handover request for handing over the user terminal associated with the base station to one of the neighboring base stations in case where the determination unit determines that the traffic currently provided by the base station is lowest; a receiving unit for receiving feedback information sent from the one of the neighboring base stations after admission control; and an executing unit for executing sleep decision after receiving handover request permitting information from the neighboring base station.

13 Claims, 9 Drawing Sheets

US 9,369,956 B2

BASE STATION IN CELLULAR NETWORK SYSTEM AND SLEEP CONTROL METHOD FOR BASE STATION

CLAIM OF PRIORITY

The present application claims priority from Chinese patent application No. 201310041016.2 filed on Feb. 1, 2013, the content of which is hereby incorporated by reference into this application.

BACKGROUND OF THE INVENTION

The present invention relates to a method for reducing interference and saving energy consumption in a cellular network, in particular to a base station with sleeping function in a cellular network and a distributed base station sleep control method.

In recent years, with the rapid increase of demand for wireless data traffic, energy consumption of cellular networks increases rapidly. In view of expenses of operators in terms of economy and carbon dioxide emission in terms of environment protection, many companies and research organizations in the world are currently developing technologies for reducing energy consumption of cellular networks. It is most efficient to decrease energy consumption of base stations since the energy consumption of base stations in a cellular network accounts for the largest proportion of that of the entire network. There is a plurality of implementations for saving base station energy consumption, which includes improving hardware design (for example adopting energy efficient power amplifier and fan-free chiller), resource allocation (for example power control), and base station deployment optimization and so on. However, the expected saved energy consumption by improving hardware design and resource allocation is limited, since base stations in operation still consume quite a lot of energy.

Since the traffic in a cellular network is very non-uniform in terms of temporal and spatial distribution, and base stations are generally deployed and operated based on their peak traffic design, base stations would not be taken full advantage of to a great extent. Therefore, a dynamic base station sleep mechanism causes the system to completely switch off some base stations that are under utilized rather than shutting down radio transceivers during low traffic hours such as nights, which could greatly reduce waste of energy. When some base stations are switched off and hence are in sleep mode, surrounding active base stations need to know and cover blank areas and ensure coverage of sleeping cells by their power amplification. This concept of self-organizing networks has been introduced into standards for 3GPP (3GPP TS32.521) for adding network intelligent functions, enabling a network to optimize and re-configure so as to reduce costs and enhance network performance and flexibility.

Base station sleep mechanism is classified into central control and distributed types. The central control type base station sleep can optimize base station sleep, and reduce the maximum energy consumption while ensuring coverage and user service quality. However it requires the traffic of all cells and channel state between users and surrounding base stations. Therefore, it is highly complex to implement the central control type base station sleep mechanism, and signaling needed to be exchanged between base stations and control nodes will increase. Thus, it is desired to develop a distributed base station sleep mechanism that allows a base station to detect traffic and to determine to enter sleep state by itself.

Patent document 1 (CN 102421172A) "Base Station, User Equipment and Method for Saving Base Station Energy Consumption" discloses a base station sleep method. This method only considers partial sleep state. When a base station detects that no user needs to be served in a period of time, it shuts down its transmitter while the receiver remain active. Patent document 2 (US2012/0106423 A1) "Energy efficient base station entering sleep mode" discloses a method for a base station to enter sleep state and wake up. This method only considers entering sleep state when there is no user to be served in a cell. The non-patent document 1 proposed a centralized high complexity algorithm and a distributed sleep mechanism. With this distributed method, a user is handed over to a neighboring cell when some base stations are in low traffic and then the base stations enter sleep state themselves. This method requires the user to exchange information with base stations, which causes increase of battery consumption of a user terminal.

SUMMARY OF THE INVENTION

The present invention has been made in view of the above-mentioned situation with the purpose of providing a base station in cellular network and a distributed base station sleep control method which enables each base station to decide whether or not sleep by itself. That is, in the present invention, the base station to be going to sleep should not only consider its cell's load condition before sleep, but also should know the load condition of its neighboring base stations to enable neighboring base stations to undertake handed over traffic demands, which guarantees service quality of remaining users of the base station and service quality of surrounding cells.

The first inventive feature of the present invention is a base station included in a cellular network system together with other neighboring base stations, which provides information service to a user terminal. The base station comprising: a determination unit for comparing states of traffic currently provided by said base station and other neighboring base stations and determining whether said base station has the lowest traffic among a plurality of base stations; an information transmission unit for sending a sleep request and a handover request for handing over the user terminal associated with said base station to one of the neighboring base stations in case where the determination unit determines that the traffic currently provided by the base station is lowest, a receiving unit for receiving feedback information sent from the one of the neighboring base stations after admission control; and an executing unit for executing sleep decision after receiving handover request permitting information from the neighboring base station.

The second inventive feature is a base station in which said base station has identical configuration as the neighboring base station and further comprises a sleep admission control unit, and the sleep admission control unit in the neighboring base station checks whether to accept handing over of the user terminal from said base station based on the condition of the neighboring base station in case where said base station sends a sleep request to the neighboring base station.

The third inventive feature is a base station in which further comprising a storage unit for storing current channel state information (CSI) of said base station, a transmission rate and a sum of transmission rates of the neighboring base stations.

The fourth inventive feature is a base station in which the determination unit determines whether a following conditional expression is satisfied, and said base station sends the sleep request to the neighboring base stations in case of satisfying the conditional expression.

$$\prod_{j \in b_m} \left( \frac{G_{jm} p_m}{\sum_{\substack{i \in I \\ i \neq m}} G_{ji} p_i} \right)^{\alpha_j} < \left( \frac{N-1}{N-2} \right)^{\sum_{n \in I_n} \sum_{k \in b_n} \alpha_k}$$

In the conditional expression, $b_m$ is a set of the user terminals associated with the base station m, I is a set of all base stations, $G_{jm}$ is a channel gain between the user terminal j and the base station m, $P_m$ is a transmitting power of the base station m, $\alpha_j$ is a current rate of service provided by the base station for the user terminal j, N is a number of the neighboring base stations of the base station m (N=3 or 4), $I_n$ is a neighboring base station set of the base station m.

The fifth inventive feature is a base station in which the receiving unit receives sleep reply information sent from the neighboring base station and receives handover request information, and the information transmission unit further informs the user terminal associated with said base station of information that the user terminal can perform a handover to the one of the neighboring base stations.

The sixth inventive feature is a base station in which the sleep admission control unit solves an infeasible set problem by calculating a following expressions, and the neighboring base station informs said base station of user handover allowing information in case where the infeasible set E is a empty set, and of user handover no-allowing information in case where the infeasible set E is not an empty set.

$$\min \sum_{i \in I} w_i e_i$$

subject to $$R_i + e_i \geq Q_i, \quad \forall\, i \in I$$

$$\sum_{i \in I} R_i / \eta \leq W_{max}, \quad \forall\, i \in I$$

$$e_i \geq 0$$

In the expressions, I is a group of the user terminal associated with the base station, $w_i$ is a weight value, $R_i$ is a reachability rate, $\eta$ is a frequency spectrum efficiency of the system, $Q_i$ is a transmission rate required by the user terminal, $W_{max}$ is a total bandwidth, a group of nonzero solution $E = \{e_0, e_1, \ldots\}$ is the infeasible set.

The seventh inventive feature is a base station further comprising a timer for setting a time period for which said base station exchanges information with the neighboring base stations, a time period for which said base station exchanges information with the user terminal, and a time period for which the neighboring base stations are prohibited to sleep after said base station sends the sleep request.

The eighth inventive feature is a base station further comprising a waking signal receiving unit, in which the neighboring base stations obtain a channel state and a transmission rate requirements of the user terminals associated with said base station and inform the waking signal receiving unit in said base station of obtained information in order to wake up said base station that is sleeping in case of decreasing a service quality of the user terminals.

The ninth inventive feature is a sleep control method for a base station existing in a cellular network system together with other neighboring base stations, which provides information service to a mobile terminal. The sleep control method including: a determination step of comparing states of traffic currently provided by the base station and other neighboring base stations and determining whether the base station has the lowest traffic among a plurality of base stations; an information transmission step of sending a sleep request and a handover request for handing over the user terminal associated with said base station to one of the neighboring base stations in case where it is determined in the determination step that the traffic currently provided by the base station is lowest; a receiving step of receiving feedback information sent from the one of neighboring base stations after admission control; and an executing step of executing sleep decision after receiving handover request permitting information from the neighboring base station.

The tenth inventive feature is a sleep control method further including a sleep admission control step in which the neighboring base stations check whether to accept a handover of the user terminal from said base station based on the condition of the neighboring base station in case where said base station sends the sleep request to neighboring base station.

The eleventh inventive feature is a sleep control method in which, in the determination step, said base station determines whether a following conditional expression is satisfied, and said base station sends the sleep request to the neighboring base stations in case of satisfying the conditional expression.

$$\prod_{j \in b_m} \left( \frac{G_{jm} p_m}{\sum_{\substack{i \in I \\ i \neq m}} G_{ji} p_i} \right)^{\alpha_j} < \left( \frac{N-1}{N-2} \right)^{\sum_{n \in I_n} \sum_{k \in b_n} \alpha_k}$$

In the conditional expression, $b_m$ is a set of the user terminals associated with the base station m, I is a set of all base stations, $G_{jm}$, is a channel gain between the user terminal j and the base station m, $P_m$ is a transmitting power of the base station m, $\alpha_j$ is a current rate of service provided by the base station for the user terminal j, N is a number of the neighboring base stations of the base station m (N=3 or 4), $I_n$ is a neighboring base station set of the base station m.

The twelfth inventive feature is a sleep control method in which, in the receiving step, the said base station receives sleep reply information sent from the neighboring base station and receives handover request information, and in the information transmission step, the said base station informs the user terminal associated with said base station of information that the user terminal can perform a handover to the one of the neighboring base stations.

The thirteenth inventive feature is a sleep control method in which, in the sleep admission control step, said base station solves an infeasible set problem by calculating a following expressions, and the neighboring base station informs said base station of user handover allowing information in case where the infeasible set E is an empty set, and of user handover not allowing information in case where the infeasible set E is not an empty set, and $$\min \sum_{i \in I} w_i e_i$$

subject to

-continued $$R_i + e_i \geq Q_i, \quad \forall\, i \in I$$

$$\sum_{i \in I} R_i/\eta \leq W_{max}, \quad \forall\, i \in I$$

$$e_i \geq 0$$

In the expressions, I is a group of the user terminal associated with the base station, $w_i$ is a weight value, $R_i$ is a reachability rate, $\eta$ is a frequency spectrum efficiency of the system, $Q_i$ is a transmission rate required by the user terminal, $W_{max}$ is a total bandwidth, a group of nonzero solution $E=\{e_0, e_1, \ldots\}$ is the infeasible set.

The fourteenth inventive feature is a sleep control method further including a timer step of measuring a time period for which said base station exchanges information with neighboring base stations, a time period for which said base station exchanges information with the user terminal, and a time period for which the neighboring base stations are prohibited to sleep after said base station sends the sleep request.

The fifteenth inventive feature is a sleep control method further including a waking step, in which the neighboring base stations obtain a channel state and a transmission rate requirements of the user terminals associated with said base station and said base station of obtained information in order to wake up said base station that is sleeping in case of decreasing a service quality of the user terminals.

A configuration of a base station of the present invention is described in detail as follows. It has a determination executing unit for controlling the entire sleep procedure with main functions of sleep entering determination, information exchange control and final sleep execution, in which the sleep entering determination process is called as sleep initialization which compares traffic states currently serviced by the base station and other neighboring base stations and determines whether the traffic of this base station is the lowest among a plurality of base stations; a neighboring base station information exchange unit for transmitting a sleep request and a handover request for handing over user terminals of this base station to neighboring base stations if the determination executing unit sets sleep initialization and accept feedback information of neighboring base stations; a switching unit for completely shutting down all other devices of the base station except for the waking signal receiving unit in case that the neighboring base station information exchange unit receives feedback information and the determination executing unit determines finally to sleep.

The base station and the base station sleep control method of the present invention can not only save energy consumption but also guarantee quality of service. Firstly, the distributed base station sleep control method of the present invention enables each base station to decide whether or not to sleep by itself and has advantages of low complexity and requiring no extra central control node, etc. In addition, the present invention proposes an admission control method for sleep mechanism at the same time to guarantee service quality of remaining users and service quality of users of surrounding cells. Further, user terminal does not participate the sleep decision in the process of entering sleep and only one handing over is performed, which thereby will not consume a battery of the terminal.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Figure 1A:
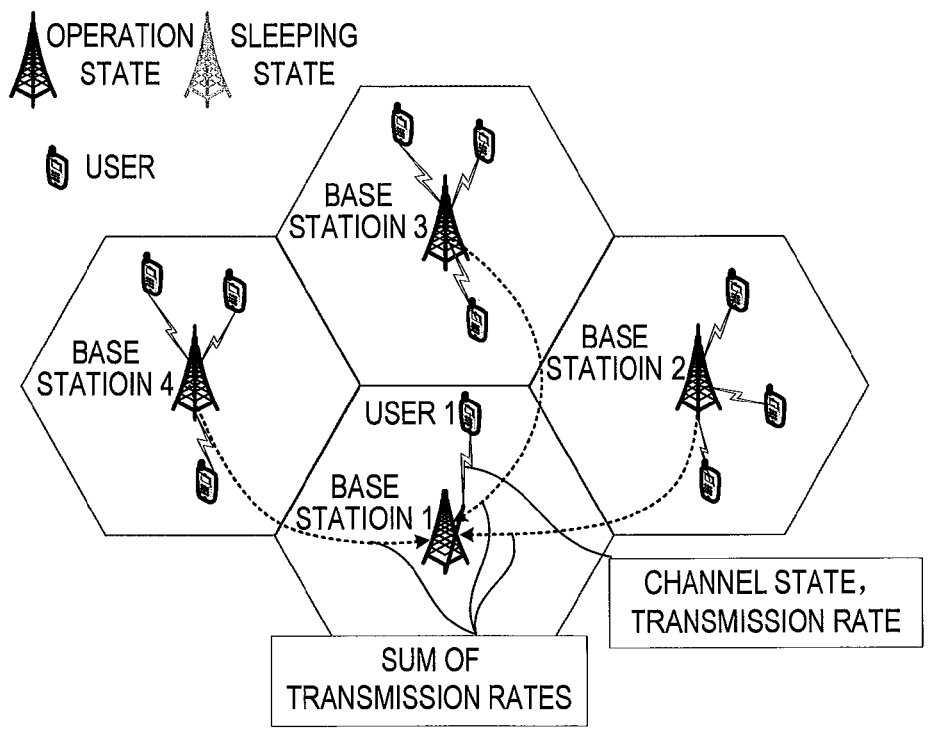
FIGS. 1A and 1B illustrate a topology of a cellular network system and an example of shutting down a base station.

The following contents relating to the present invention may be clarified from the following explanation of embodiments.

Firstly, the embodiment of the present invention proposes a low complexity of overall base station sleep control method. The base station sleep control requires close cooperation between neighboring base stations, since after the base station sleeps, neighboring base stations need to fill up coverage blanks of the sleeping base station, and the base station sleep control further needs a user handover process. In the base station sleep control method proposed in the present invention, when a certain base station is in low traffic, although users in the cell still exist, the base station can go to sleep in order to enhance energy saving effect or reduce interference among cells. The base station to be going to sleep should not only consider its cell's load condition before sleeping, but also should know load condition of neighboring base stations to enable neighboring base stations to undertake the handover traffic requirements. In the sleep process, the sleeping base station and neighboring base stations need to exchange information such as traffic state of cells, channel state between users and base stations, sleep notification signal and handover signal and so on. Therefore, a scope of the present invention includes a sleep initialization process, an overall flow of entering sleep state such as sleep handover, and a signal that needs to be exchanged.

Secondly, the embodiment of the present invention proposes a simple and effective distributed base station sleep control method. Since base station sleep influences energy saving effect and service quality, sleep determination is a core technology of the base station sleep control method. This method provides conditions for entering sleep, mainly including the following three factors current channel state, current transmission rates of users that sleeping base station is serving, and a sum of current transmission rates that neighboring base stations are serving. Each base station is compared with neighboring base stations in terms of these conditions. If the traffic of service is low, or channel state of a user being served currently is poor and the transmission rate is low, the base station is allowed to enter sleep state. This method realizes significant energy saving effect in case of low network traffic. Furthermore, the sleep mechanism of the present invention operates for 24 hours. The method allows the base station with lowest traffic among neighboring base stations to sleep in case of high traffic. This method allows a few of base stations to sleep in case of high traffic. Although the energy saving effect is not good, it can reduce influence of interference on neighboring cells and hence improving quality of service of neighboring cells.

Finally, in order to guarantee quality of service such as outage probability and a transmission rate and so on, the present invention provides an admission control method for the base station sleep mechanism. The base station sleep mode has influence on quality of service. For example, if it is decided to switch off some base stations, throughput of neighboring cells may decrease, since neighboring base stations should undertake handover traffic. Furthermore, since remaining users of the cell of the sleeping base station is far away from the handover target base station, and the channel is poor, service quality of remaining users will degrade severely. The method is implemented by testing feasibility problem of resource allocation, which is called irreducible infeasible set (IIS) set covering problem. If the handover target base station finds out an infeasible group existing after computing this problem, which means that the current resource of the base station is insufficient to meet user traffic requirement, or the channel state of the base station with the handover user is poor, the base station requesting sleep is informed of no-allowing sleep and the sleeping base station is required to terminate sleep process.

Specific implementation of the present invention will be described in detail with reference to drawings.

Figure 1B:
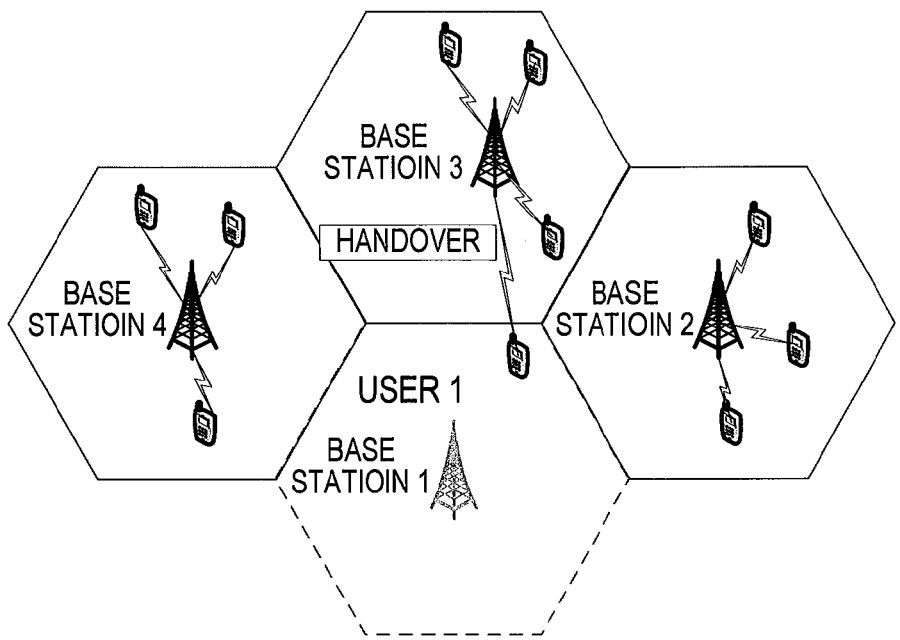

Embodiments of the present invention shown in FIG. 1A may be implemented in a cellular mobile network. For example, there are four user terminals for which macro base stations provide cell coverage in which base station 1 has only one user connected while neighboring base stations serve three users. After the base station 1 with lowest traffic receives a sum of current transmission rates of base stations 2, 3 and 4, and collects information of users which are served currently by base station 1, i.e., the transmission rate provided for user 1 by base station 1 and channel state between base station 1 and user 1, base station 1 checks sleep conditions to decide whether or not enter sleep state. The sleeping base station only needs information of a plurality of (for example three or four) base stations closest to it. Specific description of checking method is included in the following description of FIG. 7. FIG. 1B illustrates an example of base station 1 entering sleep state in which user 1 is handed over (switched) to base station 3 closest to it or receiving strongest signals.

Figure 2:
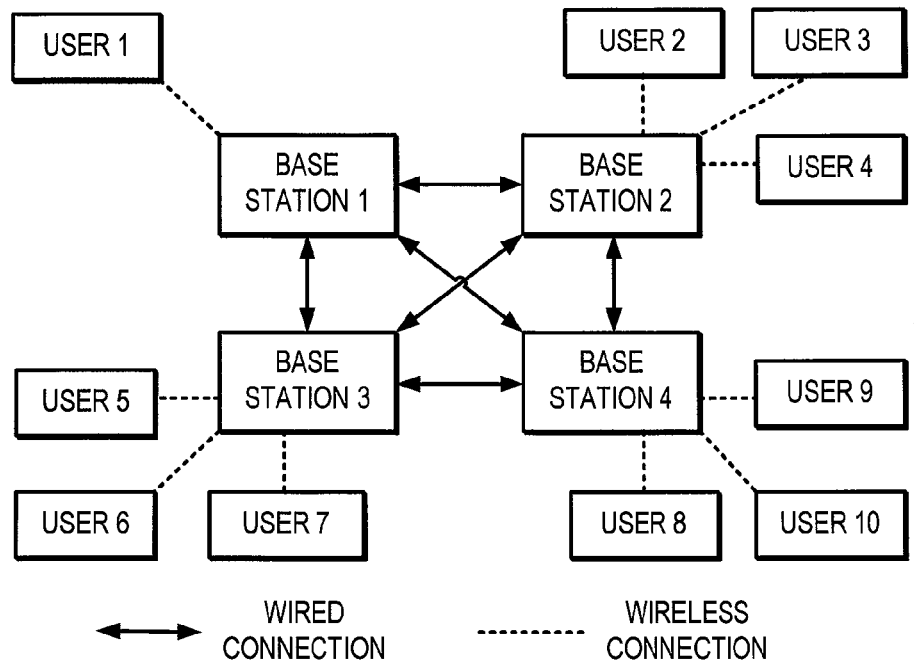
FIG. 2 is an explanatory diagram illustrating base station connections and association between the base station and a user terminal in case where there is not a radio network controller.

FIG. 2 is a schematic diagram showing backbone connection among base stations and wireless association between base stations and users. In this figure, base station control node does not exist, and base stations are connected over backbone network. It is assumed here that base stations have a function of exchanging information between base stations. However the present invention is not limited thereto.

Figure 3:
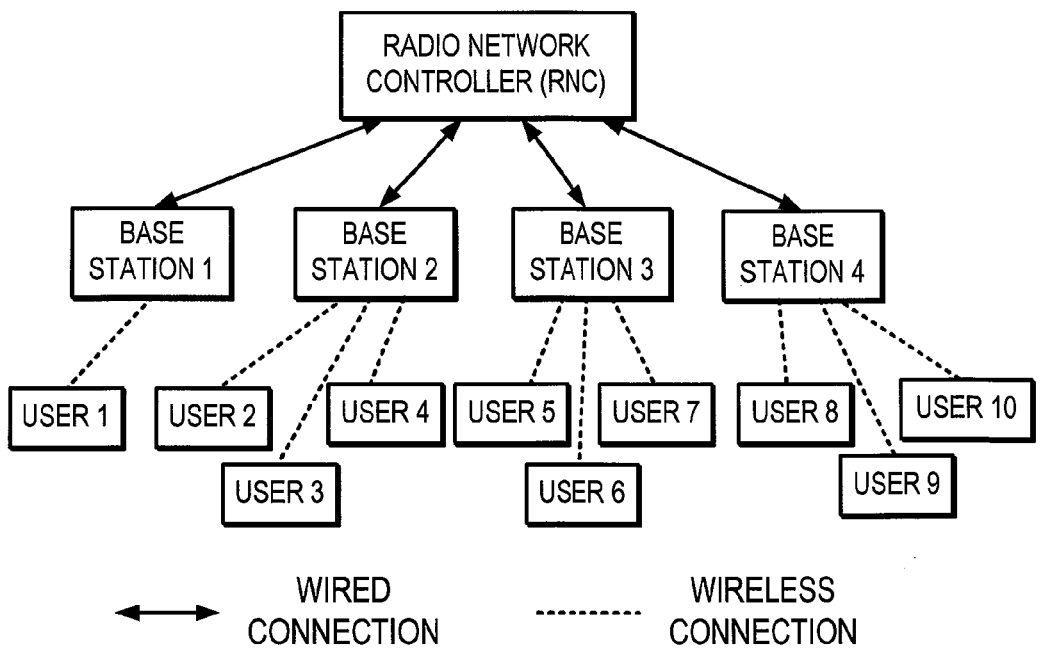
FIG. 3 is an explanatory diagram illustrating base station connections and association between the base station and the user terminal in case where there is a radio network controller.

FIG. 3 illustrates a configuration of a cellular mobile network including four base stations that are connected to a base station control node, the radio network controller. The radio network controller (RNC) is responsible for controlling base stations, Node B connected thereto in a 3G standard UMTS system. Since the base station sleep control method of the present invention is a distribution algorithm in which there is no central base station control point in sleep procedure, base stations may exchange information via a radio network controller.

Figures 4, 5:
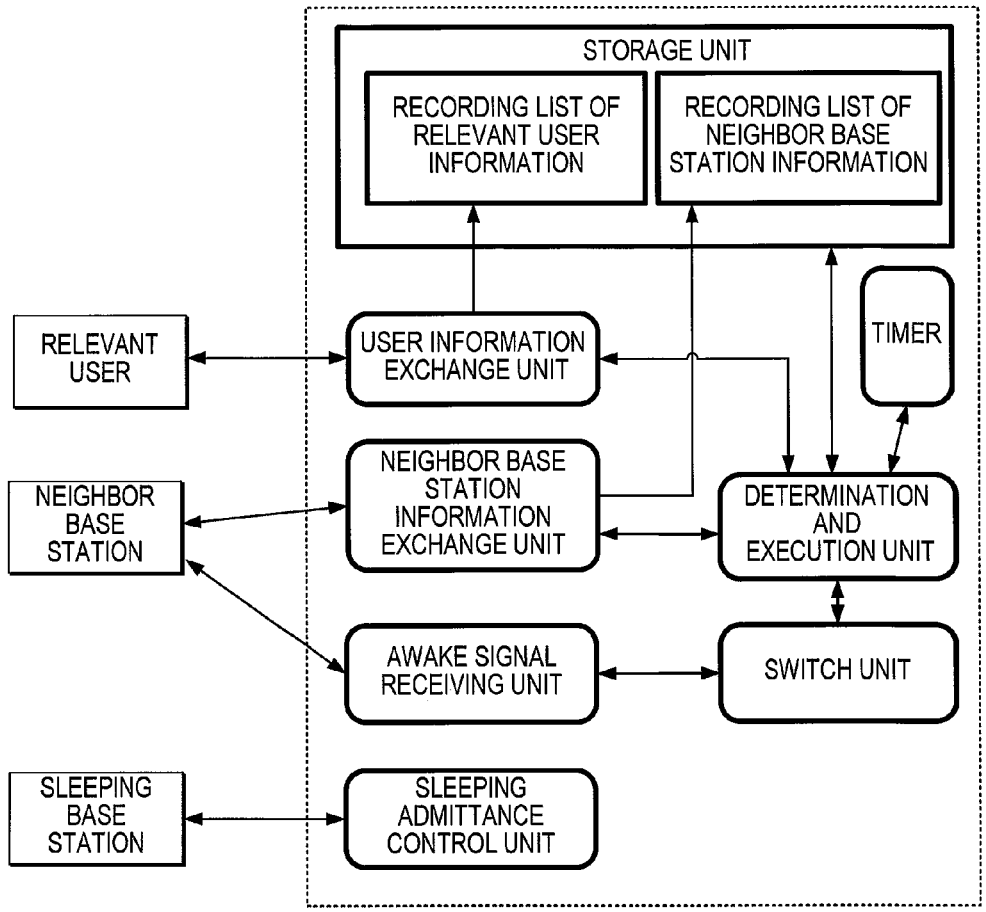
FIG. 4 is a block diagram illustrating an internal configuration of a base station.
FIG. 5 is an explanatory diagram illustrating a record list of relevant user information.
Figure 12:
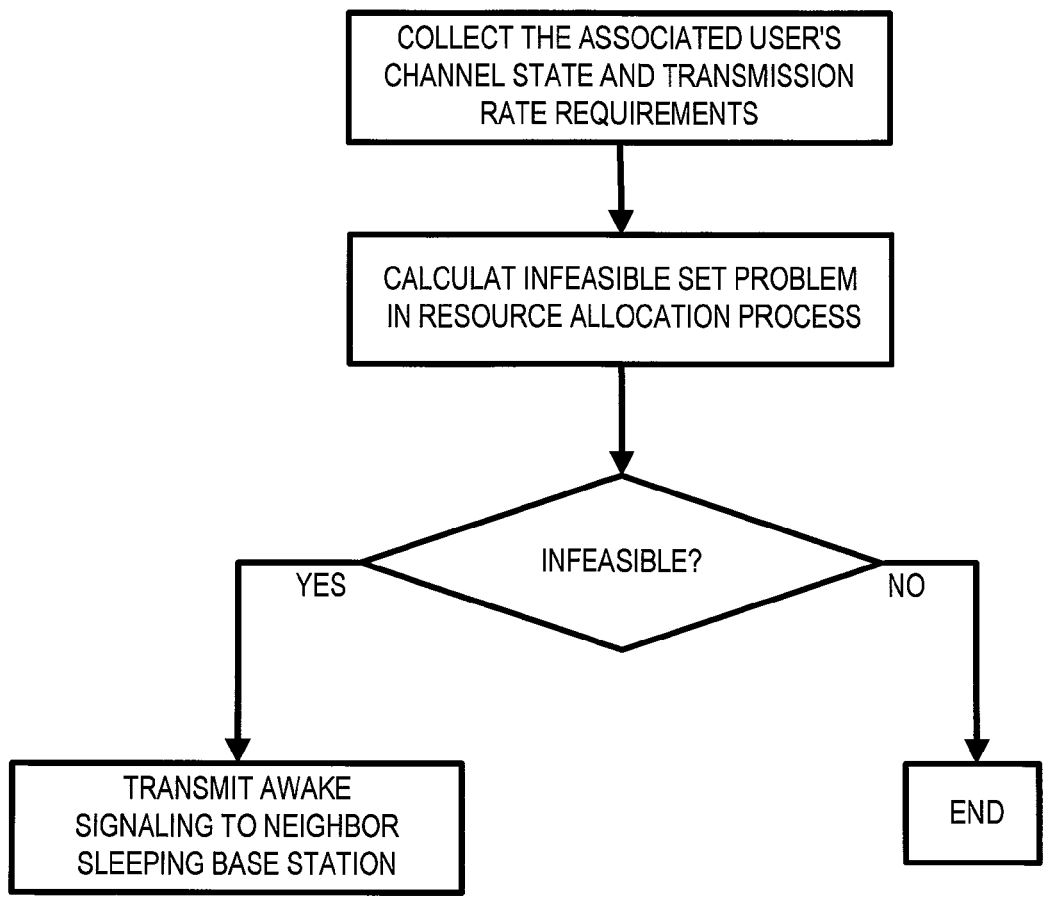
FIG. 12 is a flowchart illustrating a processing for waking up a sleeping base station.

FIG. 4 is a block diagram for illustrating an internal configuration of a base station including a determination executing unit for controlling the entire sleep procedure with main functions of sleep entering determination, information exchange control and final sleep execution, in which the sleep entering determination process is called as sleep initialization which compares traffic states currently serviced by a base station and other neighboring base stations and determines whether the traffic of this base station is the lowest among a plurality of base stations; an neighboring base station information exchange unit for transmitting a sleep request and a handover request for handing over user terminals of this base station to neighboring base stations if the determination executing unit sets sleep initialization and accepting feedback information of neighboring base stations; a user information exchange unit for collecting associated user information of this base station for sleep determination, and on the other hand, an exchanging signal with users for user handing over after sleep determination; the base station further includes a sleep admission control unit, when the base station sends a sleep request to a neighboring base station, a sleep admission control unit in the neighboring base station checks whether or not accept handing over from user terminals in the base station based on the condition of the neighboring base station; a storage unit for storing a record list of relevant user information and a record list of neighboring base station information; a waking signal receiving unit for waking up the base station from sleep state into normal operation state, which needs a stand-alone power supply to operate independently in case that the base station is in sleep state for which the work flow is illustrated in FIG. 12; a timer for setting a time on which the base station is prohibited to sleep after receiving a sleep request signal from a neighboring base station and setting a time for determining whether the user sleep handover was failed; a switching unit for completely shutting down all other devices of the base station except for the waking signal receiving unit in case that the neighboring base station information exchange unit receives feedback information and the determination executing unit determines to sleep finally.

The above-mentioned determination executing unit corresponds to the determination unit and execution unit of the claimed invention; the above-mentioned neighboring base station information exchange unit corresponds to the information transmitting and receiving unit of the claimed invention.

In addition, the above-mentioned user information exchange unit, the above-mentioned waking signal receiving unit, the above-mentioned storage unit and the above-mentioned switching unit are preferred but not essential.

FIG. 5 illustrates a record list of relevant user information which includes a user number representing an identification of recorded user(s); a channel state representing a state of a channel connecting from the recorded user to the base station; a transmission rate representing an average transmission rate of service for the recorded user; a handover mode representing a user sleep handover mode; a destination base station number representing an identification of handed over destination base station for the user; a handover starting time representing a time for identifying starting for sleep handover, a time for checking sleep handover failure and an expiration time T of a base station handover reply signal.

Figure 6:
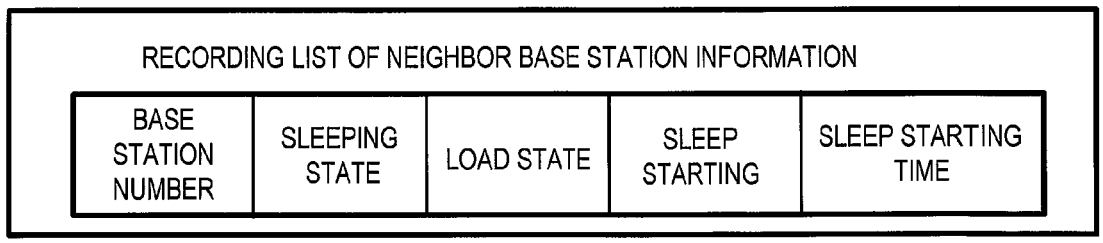
FIG. 6 is an explanatory diagram illustrating a record list of neighboring base station information.

FIG. 6 illustrates a record list of neighboring base station information which includes a base station number representing an identification of the recorded neighboring base station; a sleep state representing a sleep state of the recorded neighboring base station; a load condition representing sum of transmission rates currently provided by the recorded neighboring base stations; a sleep starting representing whether the base station is performing the sleep process when receiving a sleep request signal from the neighboring base station; a sleep starting time representing a current time when receiving the sleep request signal from an neighboring base station.

Figure 7:
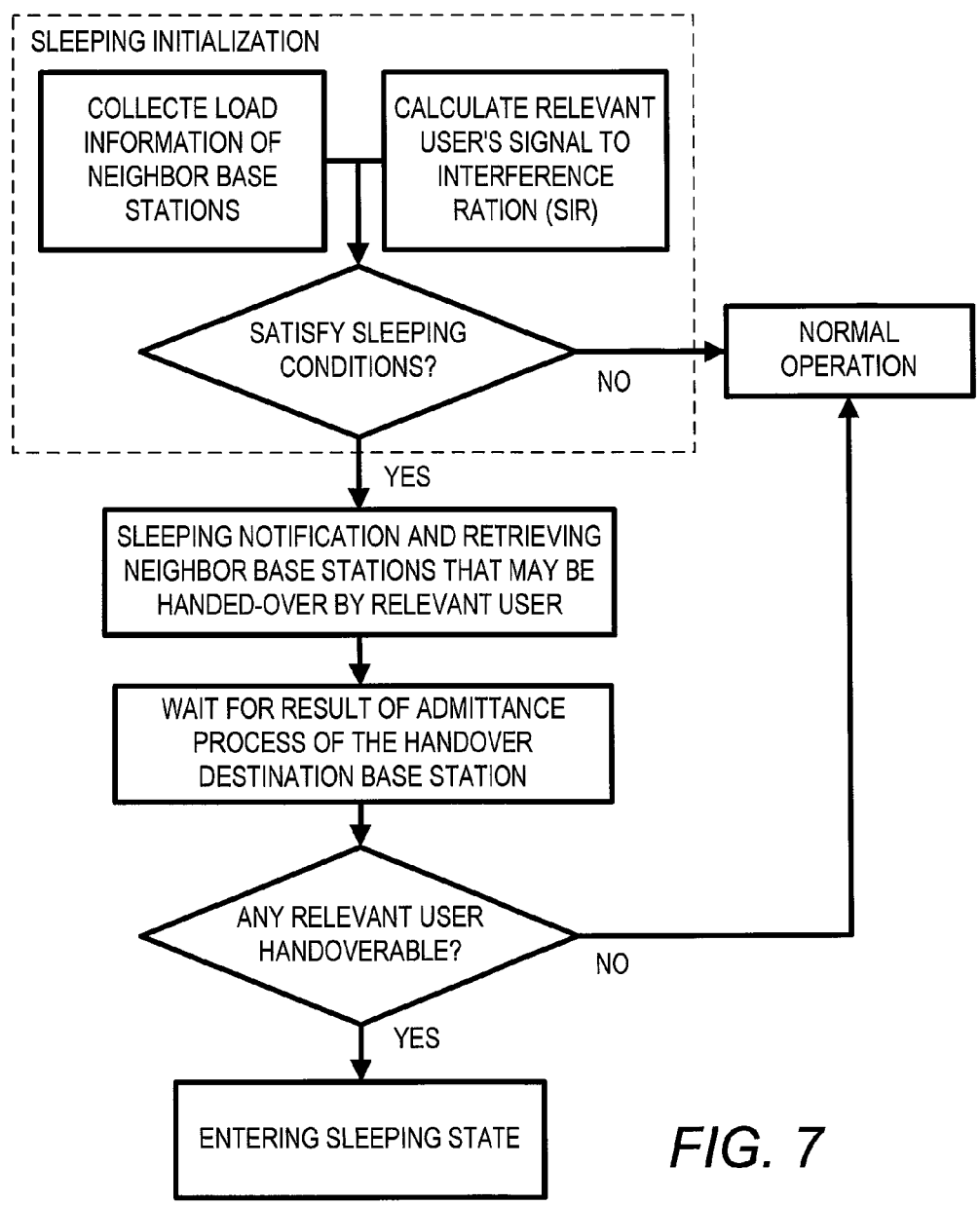
FIG. 7 is a flowchart illustrating a processing of a base station entering sleep state.

The flow of a base station entering sleep state will be explained below with reference to FIG. 7. According to the base station sleep control method provided by the present invention, a base station with low traffic may decide by itself whether or not to enter sleep. The determination executing unit needs to obtain three kinds of information including transmission rates for all users of a cell of a base station at present during sleep initialization of the base station, channel state information (CSI) and a sum of transmission rates of a plurality of (for example three or four) neighboring base stations (not requiring CSI of each of the users of neighboring base stations). The user information exchange unit and the neighboring base station information exchange unit collect these three kinds of information to be recorded in the storage unit periodically. The determination executing unit obtains these three kinds of information from the storage unit.

Firstly, the base station determines whether it can enter sleep state through the sleep initialization process. The present inventors derived the following conditional expression with communication theory and mathematical theory. Whether a certain base station m may enter sleep state should be determined by determining whether the following conditional expression is satisfied.

$$\prod_{j \in b_m} \left( \frac{G_{jm} p_m}{\sum_{\substack{i \in I \\ i \neq m}} G_{ji} p_i} \right)^{\alpha_j} < \left( \frac{N-1}{N-2} \right)^{\sum_{n \in I_n} \sum_{k \in b_n} \alpha_k}$$

In the conditional expression, $b_m$ is a set of the user of base station m, I is a set of all base station, $G_{jm}$ is the channel gain between user j and base station m, $P_m$ is the transmitting power of base station m, $\alpha_j$ is the current rate of service provided by the base station for user j, N is the number of neighboring base stations of base station m (N=3 or 4), $I_n$ is the neighboring base station set of base station m. If the above-mentioned conditional expression is satisfied, the base station m completes its sleep initialization and then sends sleep notification to neighboring base stations and notifies relevant users of neighboring base stations which can be handed over, and waits for the admission process result of the handover target base station. It determines whether there is any relevant user available for handing over, and the base station m enters sleep state when it is determined that the relevant users may be handed over to the target base station, otherwise the base station m will operate normally.

Figure 8:
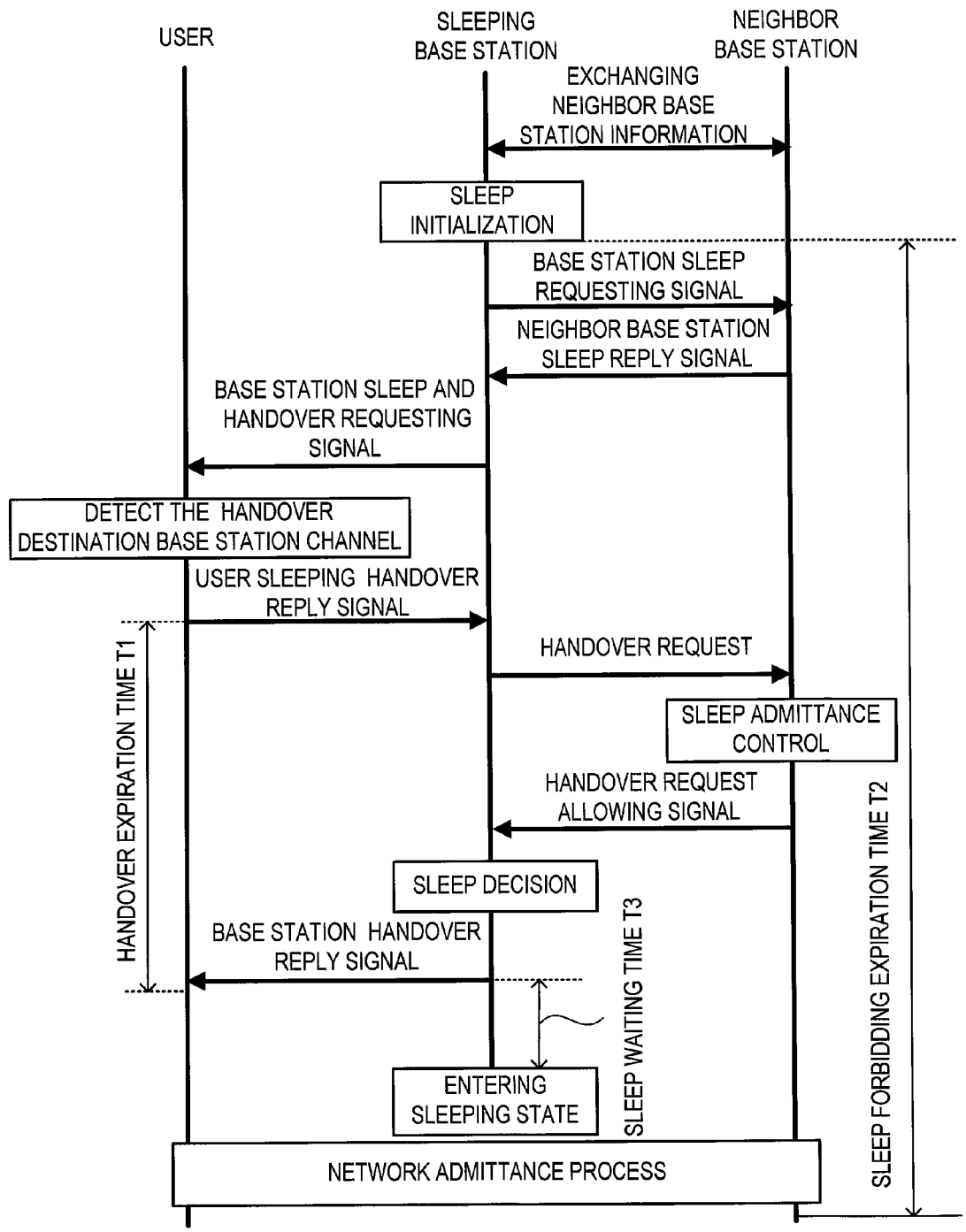
FIG. 8 is a flowchart illustrating a processing of a base station sleep signal exchange.
Figure 9A:
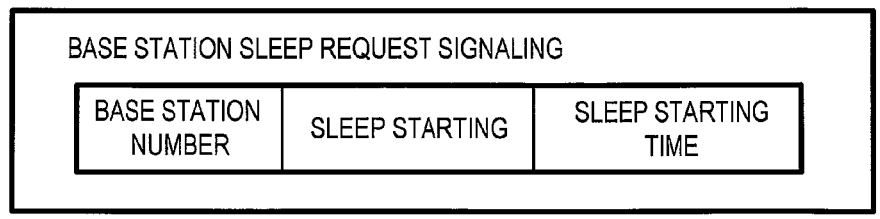
FIG. 9A is an explanatory diagram illustrating a format of a base station sleep request and a sleep handover signal format.
Figure 9B:
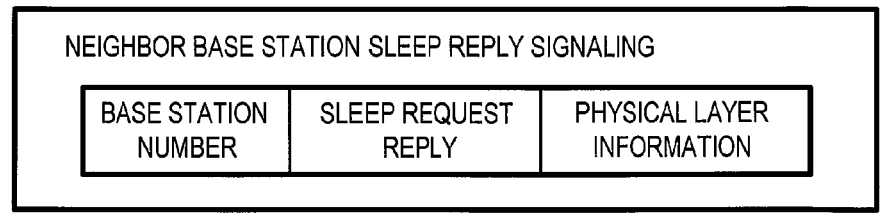
FIG. 9B is an explanatory diagram illustrating a format of a neighboring base station sleep reply signal.
Figure 9C:
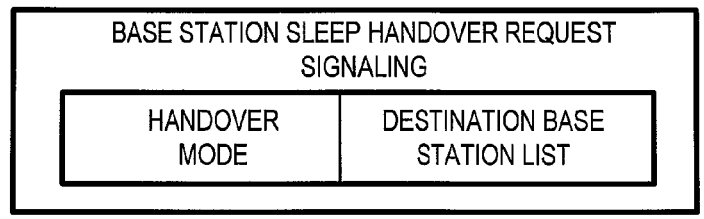
FIG. 9C is an explanatory diagram illustrating a format of a base station sleep handover request signal.
Figure 9D:
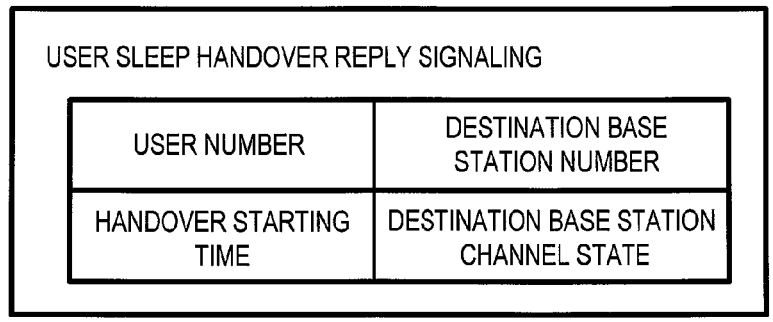
FIG. 9D is an explanatory diagram illustrating a format of a user sleep handover request signal.
Figure 9E:
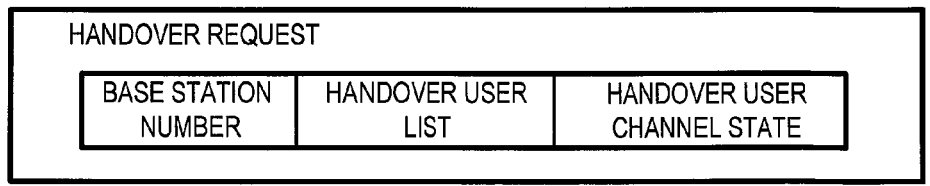
FIG. 9E is an explanatory diagram illustrating a format of a handover request signal.
Figure 9F:
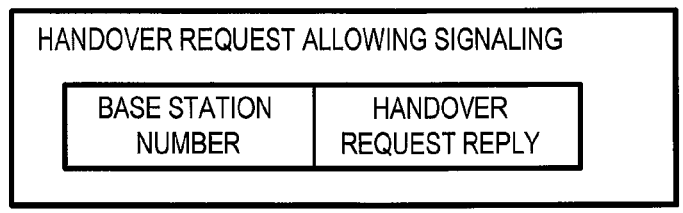
FIG. 9F is an explanatory diagram illustrating a format of a handover request permission signal.
Figure 9G:
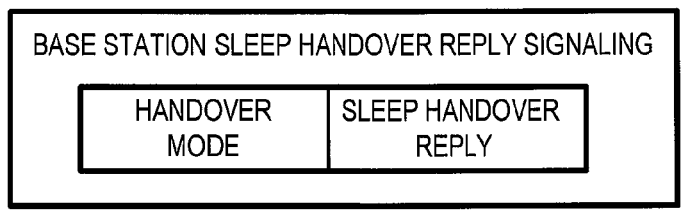
FIG. 9G is an explanatory diagram illustrating a format of a base station sleep handover reply signal.

FIG. 8 shows a flow of exchanging a base station sleep signals each of which is defined in FIGS. 9A to 9G. After the sleep initialization of base station m, the neighboring base station is informed that the present base station starts sleep initialization through "a base station sleep request signal" to prevent the neighboring base station from entering sleep state too.

After the sleeping base station receives a reply from the neighboring base station, it requests sleep handover from associated users of the base station. The associated users look for handover target base station after receiving the request signal. The sleeping base station measures a broadcast signal or a pilot signal of the neighboring base stations for a predetermined period, then reports the sequence numbers of target base stations to which can be handed over, channel state and handover starting time via "a user sleep handover reply signal".

After the sleeping base station receives the sleep request reply from a user, it requests the handover of users to the target base station. After the sleeping base station completes sleep handover request of all users, it waits for a reply from the target base station to be handed over, checks whether there is any relevant user available for handover, and if so, the sleeping base station enters sleep state after notifying all users the reply of allowing handover. Otherwise, the base station can not sleep and returns to normal operation state.

T1 and T2 are handover expiration time and sleep-prohibiting expiration time which are parameters set by the network operator according to network system.

Further, the user can detect by himself whether the sleep handover fails, and if the user receives a base station handover reply signal (allowing handover) during the expiration time T1, the user can start the network admission process with the target base station. Otherwise, this means transmission failure of the "a user sleep handover reply signal" or "a base station handover reply signal". Therefore, the user can only transmit "the user sleep handover reply signal" again.

Further, in the sleep-prohibiting expiration time T2, when a neighboring base station of a certain base station starts sleep procedure, this base station can not enter sleep state since the base station might need to undertake sleep handover users. After this base station receives sleep request signal from the neighboring base station, it can not enter sleep procedure in T2.

Figure 11:
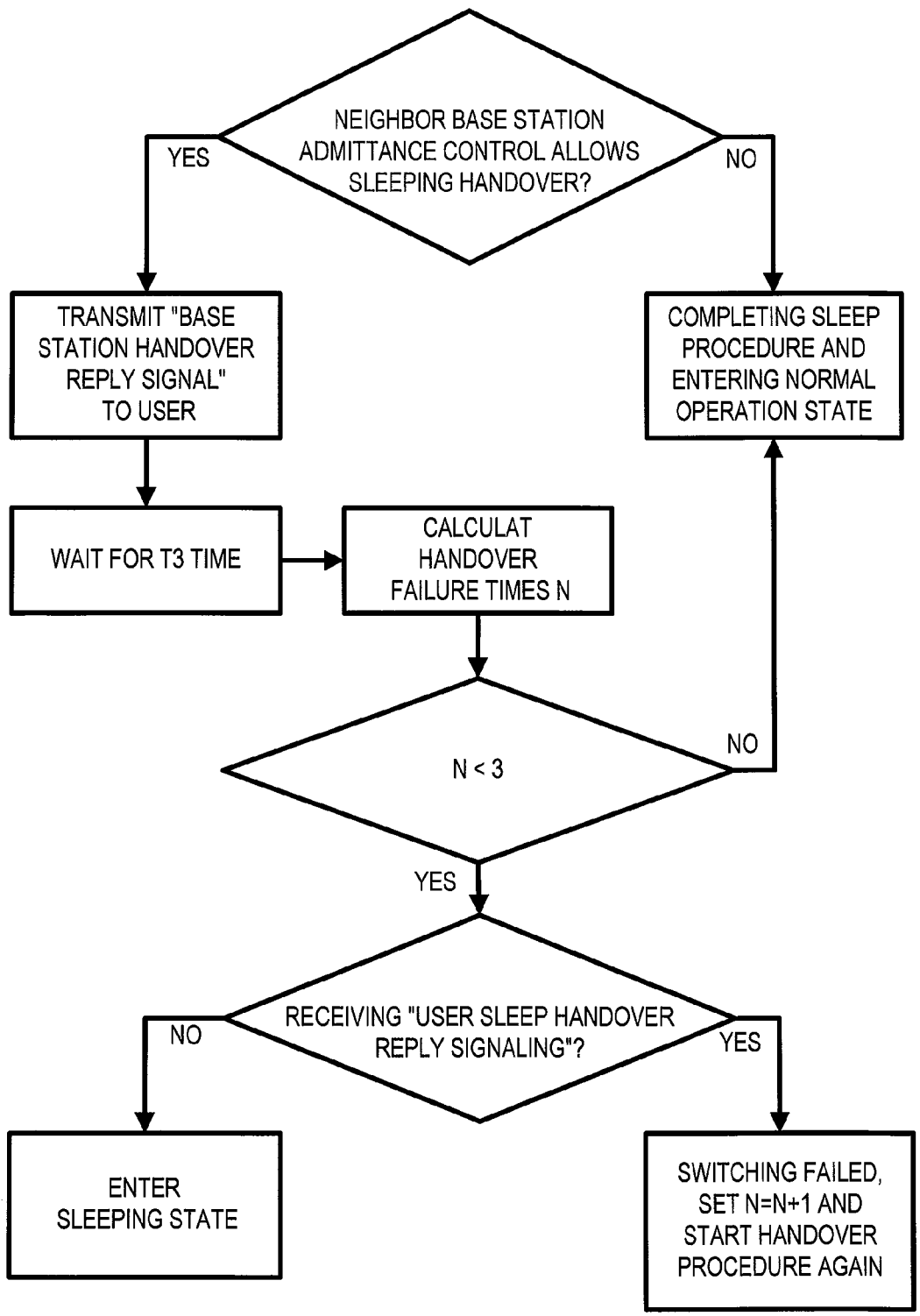
FIG. 11 is a flowchart illustrating a sleep decision.

Further, after the sleep initialized base station finally sends "the base station handover reply signal" to all users, it waits for T3 time and then can be switched off. If "the user sleep handover reply signal" is received in T3, which means transmission failure of "a base station handover reply signal", this base station interprets this signal again, if the target base station is not the same, it must resume the user sleep handover process. If the same occurs again, the sleep flow fails and it returns to normal operation. Specific procedure is shown in FIG. 11.

FIGS. 9A to 9G each illustrates the sleep request signal format and sleep handover signal format including the following contents sleep starting: marked as 1 if the sleep initialization completes; sleep starting time: recording the time point of completion of sleep initialization; physical layer information: recording the channel and synchronization information during operation of the base station; handover mode: marking a sleep handover mode; handover starting time: the time for a user to transfer a sleep handover reply signal for determining failure of the handover; handover request reply: marked as 1 if the handover is allowed after the admission control process, otherwise 0; sleep handover reply: the same as the handover request reply; source relay number: an identification of the transmitting relay; target relay number: an identification of the receiving base station; source relay channel information: channel information of the transmitting relay; load information of the source relay: load information of the transmitting relay.

Figure 10:
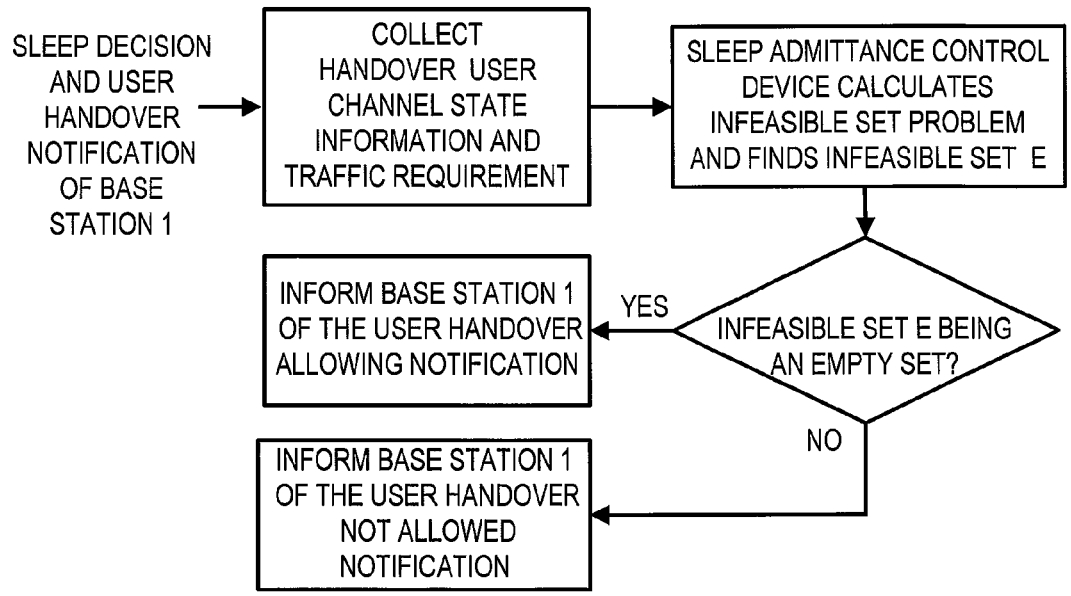
FIG. 10 is a flowchart illustrating an admission control in a neighboring base station.

FIG. 10 shows the procedure after admission process. The neighboring base stations of the sleep initialized base station would check whether to accept handover users, namely remaining users of the sleeping base station's cell, by solving infeasible problem. The infeasible set problem is represented in following expressions.

$$\min \sum_{i \in I} w_i e_i$$

subject to $$R_i + e_i \geq Q_i, \quad \forall\, i \in I$$

$$\sum_{i \in I} R_i / \eta \leq W_{max}, \quad \forall\, i \in I$$

$$e_i \geq 0$$

In the expressions, I is the user group of the base station, $w_i$ is the weight value, $R_i$ is the reachability rate, $\eta$ is the frequency spectrum efficiency of the system, $Q_i$ is the transmission rate required by a user, $W_{max}$ is the total bandwidth. The group of nonzero solution $E=\{e_0, e_1, \ldots\}$ is the infeasible set.

If the infeasible set E solved for all neighboring base stations is empty, the sleep initialized base station may enter sleep state. Otherwise, it can not enter sleep state.

FIG. 11 shows a flowchart of sleep decision. As explained with respect to FIG. 8, in case that the neighboring base station allows sleep, after the sleep initialized base station sends "a base station handover reply signal" to the user, it waits for T3 time and then calculates the number of handover failure n, if n<3, it determines whether receiving "a user sleep handover reply signal". If so, which means transmission failure of "the base station handover reply signal", it sets n=n+1, resumes the user sleep handover process. If "the user sleep handover reply signal" is not received, it enters sleep state, and if n<3 is not true, the sleep procedure ends up and it enters normal operation state.

FIG. 12 shows a flowchart of waking up a sleeping base station. If the traffic of neighboring cells increases, and the bandwidth resource is insufficient, when the quality of service lowers, it may wake up sleeping base station by force by "the waking up signal receiving unit" still in operation in the sleeping base station.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A base station included in a cellular network system together with other neighboring base stations, which provides information service to a plurality of user terminals, the base station comprising:

a processor connected to a storage unit storing first transmission states of user terminals currently being serviced by the base station and second transmission states of user terminals currently being serviced by said other neighboring base stations, wherein the storage unit stores instructions that, when executed by the processor, cause the processor to:

determine whether said base station has a lowest traffic state among said other neighboring base stations based on a comparison of the first transmission states of said base station and the second transmission states of said other neighboring base stations, when said base station has said lowest traffic state, send a sleep request to at least one of said other neighboring base stations, when said base station has said lowest traffic state, send a handover request to one of said other neighboring base stations requesting handover of at least one of the user terminals currently being serviced by said base station, receive feedback information sent from said one of said other neighboring base stations, and execute a sleep decision based on whether the feedback information is handover request allowance information allowing said base station to enter to a sleep state, wherein the sleep request is sent to at least one of said other neighboring base stations when a conditional expression is satisfied, where the conditional expression is:

$$\prod_{j \in b_m} \left( \frac{G_{jm} P_m}{\sum_{\substack{i \in I \\ i \neq m}} G_{ji} P_i} \right)^{\alpha_j} < \left( \frac{N-1}{N-2} \right)^{\sum_{n \in I_n} \sum_{k \in b_n} \alpha_k}$$

where $b_m$ is a set of the user terminals associated with the base station m I is a set of all base stations $G_{jm}$ is a channel gain between the user terminal and the base station m, $P_m$ is a transmitting power of the base station m, $\alpha_j$ is a current rate of service provided by the base station for the user terminal j, N is a number of the neighboring base stations of the base station m (N=3 or 4), and $I_n$ is a neighboring base station set of the base station m.

2. The base station according to claim 1, wherein said other neighboring base stations have an identical configuration as said base station, and wherein the storage unit further stores instructions that, when executed by the processor, cause the processor to:

determine whether to accept a hand over request from one of said other neighboring base stations based on a condition of said base station.

3. The base station according to claim 1, wherein the storage unit stores current channel state information (CSI) of said base station, and a sum of transmission rates of said other neighboring base stations.

4. The base station according to claim 1, wherein the storage unit further stores instructions that, when executed by the processor, cause the processor to:
receive sleep reply information sent from said other neighboring base stations and receive handover request information, and
inform one or more of the user terminals currently being serviced by said base station of information that the user terminals can perform a handover to said one of said other neighboring base stations.

5. The base station according to claim 2, wherein the storage unit further stores instructions that, when executed by the processor, cause the processor to:
solve an infeasible set problem by calculating a plurality of expressions including:

$$\min \sum_{i \in I} w_i e_i$$

subject to $$R_i + e_i \geq Q_i, \quad \forall i \in I$$
$$\sum_{i \in I} R_i / \eta \leq W_{max}, \quad \forall i \in I$$
$$e_i \geq 0$$

where I is a group of the user terminal associated with the base station, $w_i$, is a weight value, $R_i$, is a reachability rate, $\eta$ is a frequency spectrum efficiency of the system, $Q_i$, is a transmission rate required by the user terminal, $W_{max}$ is a total bandwidth, and a group of nonzero solution $E=\{e_0, e_1, \ldots\}$ is the infeasible set,
when the infeasible set E is an empty set, allow the hand over request from one of said other neighboring base stations, and
when the infeasible set E is not an empty set, reject the hand over request from one of said other neighboring base stations.

6. The base station according to claim 1, further comprising:
a timer, connected to said processor, for setting a time period for which said base station exchanges information with said other neighboring base stations, a time period for which said base station exchanges information with said user terminals, and a time period for which said other neighboring base stations are prohibited to sleep after said base station sends the sleep request.

7. The base station according to claim 1,
wherein said other neighboring base stations obtain channel state and transmission rate requirements of the user terminals currently being serviced by said base station, and inform said base station of obtained information in order to wake up said base station that is in the sleep state in a case of decreasing a service quality of the user terminals.

8. A sleep control method for a base station existing in a cellular network system together with other neighboring base stations, which provides information service to a plurality of user terminals, where said base station and said other neighboring base stations each comprise a processor and a storage unit storing first transmission states of user terminals currently being serviced by the base station and second transmission states of user terminals currently being serviced by said other neighboring base stations,
the sleep control method comprising:
determining whether said base station has a lowest traffic state among said other neighboring base stations based on a comparison of the first transmission states of said base station and the second transmission states of said other neighboring base stations;
when said base station has said lowest traffic state, sending a sleep request to at least one of said other neighboring base stations;
when said base station has said lowest traffic state, sending a handover request to one of said other neighboring base stations requesting handover of at least one of the user terminals currently being serviced by said base station;
receiving feedback information sent from said one of said other neighboring base stations; and
executing a sleep decision based on whether the feedback information is handover request allowance information allowing said base station to enter to a sleep state,
wherein the sleep request is sent to at least one of said other neighboring base stations when a conditional expression is satisfied, where the conditional expression is:

$$\prod_{j \in b_m} \left( \frac{G_{jm} p_m}{\sum_{\substack{i \in I \\ i \neq m}} G_{ji} p_i} \right)^{\alpha_j} < \left( \frac{N-1}{N-2} \right)^{\sum_{n \in I_n} \sum_{k \in b_n} \alpha_k}$$

where $b_m$ is a set of the user terminals associated with the base station m, I is a set of all base stations $G_{jm}$ is a channel gain between the user terminal j and the base station m, $P_m$ is a transmitting power of the base station m, $\alpha_j$ is a current rate of service provided by the base station for the user terminal j, N is a number of the neighboring base stations of the base station m (N=3 or 4), and $I_n$ is a neighboring base station set of the base station m.

9. The sleep control method according to claim 8, further comprising:
determining whether to accept a hand over request from one of said other neighboring base stations based on a condition of said base station.

10. The sleep control method according to claim 8, further comprising:
receiving sleep reply information sent from the at least one of said neighboring base stations and receiving handover request information, and
informing one or more of the user terminals currently being serviced by said base station that the one or more of the user terminals can perform a handover to the one of the neighboring base stations.

11. The sleep control method according to claim 9, further comprising:
solving an infeasible set problem by calculating a plurality of expressions including:

$$\min \sum_{i \in I} w_i e_i$$

subject to

-continued $$R_i + e_i \geq Q_i, \quad \forall\, i \in I$$

$$\sum_{i \in I} R_i/\eta \leq W_{max}, \quad \forall\, i \in I$$

$$e_i \geq 0$$

in the expressions, i is a group of the user terminal associated with the base station, $w_i$, is a weight value, $R_i$, is a reachability rate, $\eta$ is a frequency spectrum efficiency of the system, $Q_i$ is a transmission rate required by the user terminal, $W_{max}$ is a total bandwidth, and a group of nonzero solution $E=\{e_0, e_1, \ldots\}$ is the infeasible set;

when the infeasible set E is an empty set, allowing the hand over request from one of said other neighboring base stations; and when the infeasible set E is not an empty set, rejecting the hand over request from one of said other neighboring base stations.

12. The sleep control method according to claim 8, further comprising:

setting a time period for which said base station exchanges information with said other neighboring base stations, a time period for which said base station exchanges information with the user terminal, and a time period for which the neighboring base stations are prohibited to sleep after said base station sends the sleep request.

13. The sleep control method according to claim 8, wherein said other neighboring base stations obtain channel state and transmission rate requirements of the user terminals associated with said base station and informing said base station of the obtained information in order to wake up said base station that is in the sleep state in a case of decreasing a service quality of the user terminals.

\* \* \* \* \*